United States Patent [19]
Løken

[11] 4,077,133

[45] Mar. 7, 1978

[54] PROCEDURE FOR DEHYDRATING AND DRYING FINE-GRAINED PRODUCTS AND IN ADDITION A DEVICE TO BE USED FOR THE EXECUTION OF THE PROCEDURE

[75] Inventor: Per A. Løken, Ski, Norway

[73] Assignee: Myrens Verksted A/S, Oslo, Norway

[21] Appl. No.: 696,632

[22] Filed: Jun. 16, 1976

[30] Foreign Application Priority Data

Aug. 21, 1975 Norway .................................. 752903

[51] Int. Cl.² .............................................. F26B 7/00
[52] U.S. Cl. ........................................... 34/17; 34/19; 34/60; 34/69; 210/68
[58] Field of Search ................... 34/17, 18, 19, 60, 69, 34/70, 71; 210/68

[56] References Cited

U.S. PATENT DOCUMENTS

| | | | |
|---|---|---|---|
| 1,967,197 | 7/1934 | Besselievre | 210/68 |
| 2,049,071 | 7/1936 | McCormick | 34/17 X |
| 2,081,398 | 5/1937 | Giles | 210/68 |
| 3,191,314 | 6/1965 | Flournoy | 34/70 |

*Primary Examiner*—John J. Camby
*Attorney, Agent, or Firm*—Finnegan, Henderson, Farabow & Garrett

[57] ABSTRACT

When dehydrating and drying fine-grained products which are present in slurry form, dehydration is first carried out in a filter and in conjunction drying in a drying cylinder, inasmuch as the filtering takes place under pressure which is provided by means of the exhaust steam from the drier.

7 Claims, 1 Drawing Figure

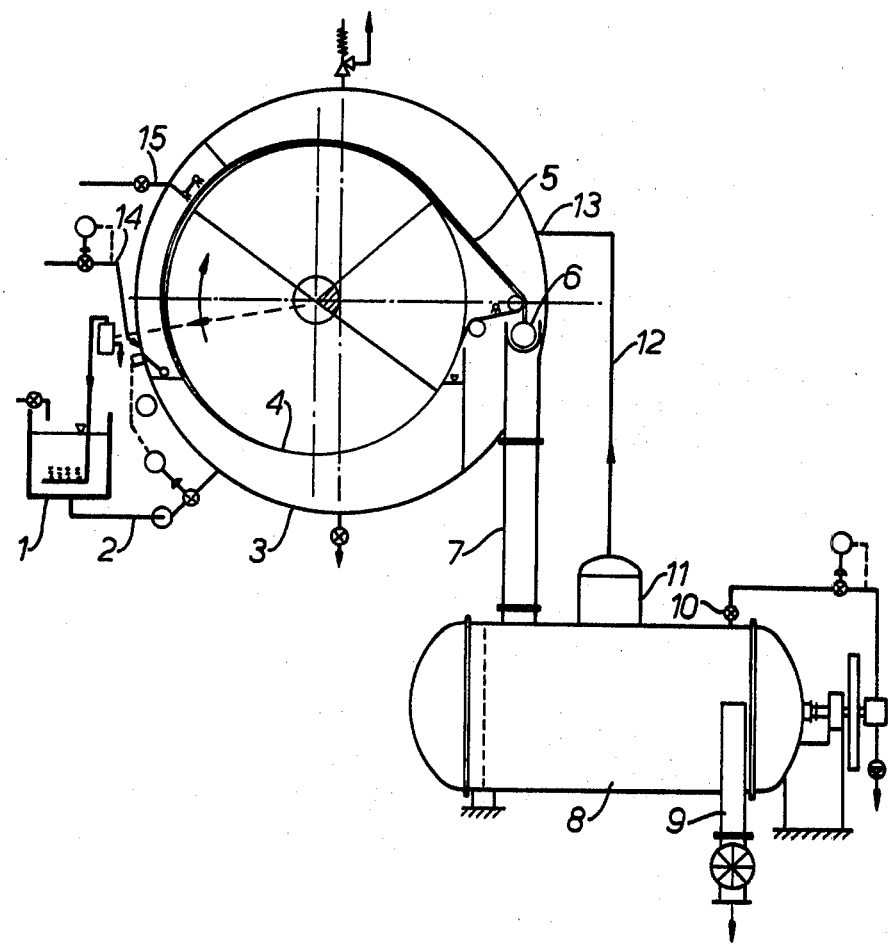

PROCEDURE FOR DEHYDRATING AND DRYING FINE-GRAINED PRODUCTS AND IN ADDITION A DEVICE TO BE USED FOR THE EXECUTION OF THE PROCEDURE

The invention relates to a procedure for dehydrating and drying fine-grained products, initially present in slurry-form through successive dehydration in a filter and subsequent drying in a drying cylinder.

The invention relates also to a device to be used for the execution of the procedure.

The procedure and the device are primarily intended to be used for products which are mixed with water. The invention is, however, also applicable in cases where the liquid is not water, but a solvent or the like.

The dehydration of fine-grained products is today usually carried out by means of filtration, followed by drying. For these two stages of operation a number of different types of equipment may be chosen, so that a maximum effect is achieved taking into consideration the investment costs and the operational expenses.

There are a number of different types of filters of which the continuous vacuum filter is most used. There, however, the greatest difference in pressure is limited to under 1 ata, and the temperature on the filter cake is also limited to avoid the formation of steam in the filter cake. These disadvantages can be avoided if a pressure filter is used. Such filters can be used for interrupted as well as continuous operation. The advantage with pressure filtering is that the pressure difference above the filter cake can be increased considerably in comparison with a vacuum filter. At the same time higher temperature on the filter cake may be used freely. Even steam is used for blowing through the filter cake, so that the outgoing water content can be reduced considerably. The problem with a continuous pressure filter is, however, that the filter cake must be sluiced out from the pressure system.

The usual drying devices employ ordinarily large quantities of air in contact with the drying material, and it is generally assumed that it is necessary to have air to carry away the water vapour which forms during the drying period. The disadvantages with the conventional drying devices consist in greater energy consumption than the theoretical minimum, and in addition considerable problems with purification of the great amounts of exhaust gas. With increased energy costs and constantly increasing regulations with respect to environmental protection, the importance of the disadvantages stated has become greater than before.

The purpose of the present invention is to avoid the above mentioned problems both with filtering and with drying, and to provide a procedure and a device as well for combined filtering and drying, which completely eliminates emission of polluting exhaust gases, and at the same time reduces the energy consumption.

This is achieved by a procedure of the type mentioned in the introduction, which is characterized in that which is appearing in the claims.

The invention relates also to a device which is characterized by the device claims.

The exhaust steam from the drying process is led to the filter and gives the pressure difference over the filter cloth at the same time as the steam passes through the filter cake. The exhaust steam is thereby cleaned of dust which is led back to the process, and the exhaust steam warms up the filter cake in such a way that the viscosity of the liquid is reduced. This makes for a lower water content in the filter cake. The steam which passes through the filter is led to the in-going slurry and condenses in the latter. The filter cake is led in the usual way directly down into the dryer, as there is the same pressure in the two components.

In that the exhaust steam from the dryer is pressed through the filter cake, it becomes cleaned, and the dust is held back in the filter cake. Thus a pollution-free drying process is achieved, at the same time as the dust is led back to the process.

It is not a good idea that a too large part of the exhaust steam comes in direct contact with the slurry in the filter, because the steam will then condense. In order to reduce this, air can be added which is led in over the level of liquid in the filter.

The pressure in the dryer/filter will adjust so that a balance is maintained between the steam produced in the dryer and the amount of steam which passes through the filter cake. If a higher pressure is desired than that allowed to keep the balance, air-pressure can be added to the filter.

The filter can operate as an ordinary pressure filter with atmospheric pressure on the underside of the filter cloth. It is also entirely possible to arrange a vacuum pump on the suction side of the filter. A greater difference in pressure is thereby achieved or an interesting result even with a relatively low pressure in the dryer/filter, e.g. atmospheric pressure.

The advantages with the invention are that an increased filtering capacity is obtained in relation to the filter cake. Moreover, pollution is avoided, economic heating is achieved and the system is extensively self-regulating. The invention can be used for products which are not too sensitive to temperature. In addition, the product must be relatively fine-grained to benefit from the filtering.

The invention will be as follows explained more in detail by means of an embodiment which appears in the drawing, which shows a diagrammatic tracing of a device for carrying out the invention.

The fine-grained product is added in slurry form to a container 1 and from the latter is led on via a supply pipe 2 to a filter unit 3, where the slurry is gathered up in the lower part of the housing. The filter is an ordinary rotating pressure filter with a rotating component 4 around which is laid a filter cloth 5 and is led down through a sluice 6 and out through a transport canal 7 and down into a pressure dryer 8 which is of an ordinary type, e.g. a rotating contact dryer. The product is dried in the dryer 8 and led out through a canal 9. When starting-up and in cases when an extra supply of fresh steam is desirable, steam is supplied through pipe 10.

The exhaust steam from the drier, which mainly consists of water vapour which contains dust, is led out of the drier at 11 and is led through a pipe 12 back to the filter where it is led in on the pressure side of the filter at 13. As the exhaust is supplied on the pressure side of the filter, it will be pressed through the filter cake and be cleansed of dust which is held back in the cake. A pollution-free drying process is hereby achieved at the same time as the dust is carried back to the process.

In order that not too large a part of the exhaust steam should come in direct contact with the slurry in the filter, as the steam would hereby condense, air can be supplied above the level of the liquid in the filter through a pipe 14. The washing water can be supplied in the conventional way as indicated by pipe 15.

The pressure in the system will adjust itself in such a way that a balance is maintained between the steam produced in the drier and the amount of steam which passes through the filter cake. If a higher pressure is wished than that required to maintain this balance, additional air pressure can be supplied through pipe 14 also.

If a greater difference in pressure is wished for over the filter, there is also a possibility of arranging a vacuum pump of the suction side from the filter.

Both the filter and the drier operate moreover, in a conventional way.

It is also completely impossible to use other known embodiments of the filter media and to remove the filter cake. Other filter types, as e.g. the disc filter, can also be used within the frame of the invention.

Having described my invention, I claim:

1. A method of dehydrating and drying fine grained products initially present in slurry form comprising the steps of: passing the fine-grained products into a pressure filter, providing a pressure difference across the filter to form a filter cake of the products on the filter, passing the filter cake into a contact dryer, communicating the exhaust steam from the contact dryer to the pressure side of the filter for passage through the filter cake and filter, and maintaining a substantially identical pressure in the contact dryer and on the high pressure side of the pressure filter by maintaining open communication between the pressure filter and the contact dryer.

2. A method according to claim 1 including rotating the filter through the slurry to form the filter cake thereon.

3. A method according to claim 8 including supplying additional air to the filter above the level of slurry in the filter.

4. A method according to claim 1 including providing vacuum pressure on the other side of the filter to increase the pressure difference across the filter.

5. Apparatus for use in dehydrating and drying fine-grained products comprising: a closed pressure filter for receiving fine-grained products in a slurry form and including a rotating pressure filter, means providing a pressure difference across the filter whereby a cake of the fine-grained products is formed on said filter, a closed contact dryer, a steam line in communication between said dryer and the side of said filter which is subject to the higher pressure, means for transporting the filter cake in the filter to the dryer, said transport means being in open communication between said pressure filter and said dryer so that a generally identical pressure is maintained in both said filter and said dryer through said transport means and said steam line.

6. Apparatus according to claim 5 wherein said filter comprises a rotating pressure filter.

7. Apparatus according to claim 6 including means of supplying air to said pressure filter at a location above the level of the slurry therein.

* * * * *

UNITED STATES PATENT AND TRADEMARK OFFICE
CERTIFICATE OF CORRECTION

PATENT NO. : 4,077,133
DATED : March 7, 1978
INVENTOR(S) : Per A. Løken

It is certified that error appears in the above-identified patent and that said Letters Patent are hereby corrected as shown below:

Column 4, line 4, "8" should read --1--.

Signed and Sealed this

Thirteenth Day of February 1979

[SEAL]

Attest:

RUTH C. MASON
Attesting Officer

DONALD W. BANNER
Commissioner of Patents and Trademarks